United States Patent [19]
Loustau et al.

[11] Patent Number: 5,558,681
[45] Date of Patent: Sep. 24, 1996

[54] METHOD OF BONDING A METAL CONNECTION TO AN ELECTRODE INCLUDING A CORE HAVING A FIBER OR FOAM-TYPE STRUCTURE FOR AN ELECTROCHEMICAL CELL, AND A RESULTING ELECTRODE

[75] Inventors: Marie-Thérèse Loustau; Roelof Verhoog, both of Bordeaux; Claude Precigout, Lormont, all of France

[73] Assignee: SAFT, Romainville, France

[21] Appl. No.: 248,238

[22] Filed: May 24, 1994

[30] Foreign Application Priority Data

May 26, 1993 [FR] France ................... 93 06314

[51] Int. Cl.$^6$ ........................................ H01M 2/26
[52] U.S. Cl. ........................... 29/623.4; 427/198
[58] Field of Search .............. 29/623.4; 427/198; 429/211, 237

[56] References Cited

U.S. PATENT DOCUMENTS

| | | | |
|---|---|---|---|
| 2,861,115 | 11/1958 | Berg | 429/237 X |
| 3,055,963 | 9/1962 | Krebs. | |
| 4,119,771 | 10/1978 | Saridakis | 429/211 X |
| 5,077,153 | 12/1991 | Grange-Cossou et al. | 29/623.4 X |
| 5,085,956 | 2/1992 | Imhof et al. | 429/211 |
| 5,246,797 | 9/1993 | Imhof et al. | 429/211 |

FOREIGN PATENT DOCUMENTS

| | | |
|---|---|---|
| 0490316A1 | 6/1992 | European Pat. Off.. |
| 2111024 | 6/1972 | France. |
| 61-259454 | 11/1986 | Japan ................. H01M 2/26 |
| 2200068A | 7/1988 | United Kingdom. |

OTHER PUBLICATIONS

Japanese Patent Abstract 59–105264 dated Jun. 18, 1984, 2nd Kokai 59–105264.
Japanese Patent Abstract 60–235360 dated Nov. 22, 1985, 2nd Kokai 60–235360.
Japanese Patent Abstract 57–34668 dated Feb. 25, 1982.
French Search Report Fr 9306314, Feb. 1994.

Primary Examiner—Stephen Kalafut
Attorney, Agent, or Firm—Sughrue, Mion, Zinn, Macpeak & Seas

[57] ABSTRACT

A method of bonding a metal connection to an electrode including a core having a fiber or foam-type structure for an electrochemical cell, in which method at least one metal strip is pressed against one edge of the core and is welded thereto under compression, wherein, at least in line with the region in which said strip is welded to the core, which is referred to as the "main core", a retaining core of a type analogous to that of the main core is disposed prior to the welding.

15 Claims, 5 Drawing Sheets

5,558,681

METHOD OF BONDING A METAL CONNECTION TO AN ELECTRODE INCLUDING A CORE HAVING A FIBER OR FOAM-TYPE STRUCTURE FOR AN ELECTROCHEMICAL CELL, AND A RESULTING ELECTRODE

The present invention relates to a method of bonding a metal connection to an electrode including a core having a fiber or foam-type structure for an electrochemical cell, and in particular for batteries of storage cells designed for industrial applications and for use in providing traction.

BACKGROUND OF THE INVENTION

The use of fiber or foam cores for such applications is extremely advantageous because it enables the weight of the batteries to be considerably reduced. But, in addition to its light weight, the core of the electrode must be highly porous, it must be conductive, and it must be mechanically strong enough at the bond between it and its electrical connection which is a rigid metal conductor, e.g. a steel strip.

Such bonding is generally performed by welding. The edge of the core is pressed against the connection, and it is welded thereto under pressure. Patent Application FR-A-2 604 302 and U.S. Pat. No. 5,085,956 describe such methods.

In another variant, it is possible to use two metal strips, one on each side of an edge of the core of the electrode, the strips being welded to the core electrically.

It has been observed that such solutions are not satisfactory with respect to the electrical and mechanical performance levels of the electrode.

OBJECTS AND SUMMARY OF THE INVENTION

An object of the present invention is to provide an improved method that enables said performance levels to be improved considerably.

The present invention provides a method of bonding a metal connection to an electrode including a core having a fiber or foam-type structure for an electrochemical cell, in which method at least one metal strip is pressed against one edge of said core and is welded thereto under compression, wherein, at least in line with the region in which said strip is welded to said core, which is referred to as the "main core", a retaining core of a type analogous to that of said main core is disposed prior to the welding.

In a first variant, said metal strip is interposed between said main core and said retaining core.

In a second variant, two metal strips are used, one on each side of the assembly formed by said main core and by said retaining core.

Preferably, the height of metal strip that is secured to said cores is less than half the height of said retaining core.

With either one of the above variants, in a first embodiment of an electrode of the invention, said bonding is performed prior to pasting the electrochemically-active substance onto said main core and onto said retaining core, whereafter the entire electrode is compressed to a predetermined thickness.

In a second embodiment of an electrode of the invention, firstly said main core and said retaining core are bonded together by compression, then an electrically-conductive electrochemically-active substance is pasted onto the resulting assembly, the entire electrode is compressed to a predetermined thickness, and the connection is welded to the electrode.

When the electrochemically-active substance is not conductive, it is not pasted onto the main core or onto the retaining core in the region in which said connection is welded.

To improve the fastening between said main core and said retaining core still further, a plurality of perforations, e.g. of diameter lying in the range 2 mm to 8 mm, are provided in either one of said cores, e.g. at a pitch lying in the range 5 mm to 50 mm. On being compressed, the two cores become interfitted.

It is also possible to improve said fastening by presecuring the main core to the retaining core by electrical or ultrasonic spot welding.

For example, the electrochemically-active substances may be chosen from nickel hydroxide, hydridable alloys, carbon, cadmium oxide, zinc oxide, zinc hydroxide, and silver oxide. Conventional additives are added to the various active substances.

The material of said main core and of said retaining core may be chosen from a nickel foam, a nickel-plated foam, and a nickel-plated or silver-plated polyurethane felt.

Advantageously, said strip is made of nickel-plated steel having a thickness lying in the range 0.05 mm to 1 mm; said main core and said retaining core are made of nickel foam having a weight per unit area lying in the range 200 $g/m^2$ to 2,000 $g/m^2$, the initial thickness of the main core lying in the range 0.5 mm to 5 mm, and the initial thickness of the retaining core also lying in the range 0.5 mm to 5 mm; preferably, the weight per unit area is about 500 $g/m^2$, the initial thickness of the main core is 1.7 mm, and the initial thickness of the retaining core is also 1.7 mm.

When mechanical stresses on the connection are expected to be particularly large, it is preferable to chose a weight per unit area for the retaining core that is greater than the weight per unit area of the main core. Therefore, said main core is made of nickel foam having a weight per unit area lying in the range 500 $g/m^2$ to 900 $g/m^2$, and an initial thickness lying in the range 1.4 mm to 2.5 mm, and said retaining core is made of nickel foam having a weight per unit area lying in the range 500 $g/m^2$ to 1,500 $g/m^2$, and an initial thickness lying in the range 1.4 mm to 2.5 mm.

BRIEF DESCRIPTION OF THE DRAWINGS

Other characteristics and advantages of the present invention will appear on reading the following description of embodiments given by way of non-limiting example and with reference to the accompanying drawings, in which.

MORE DETAILED DESCRIPTION

Example I

Figure 1:
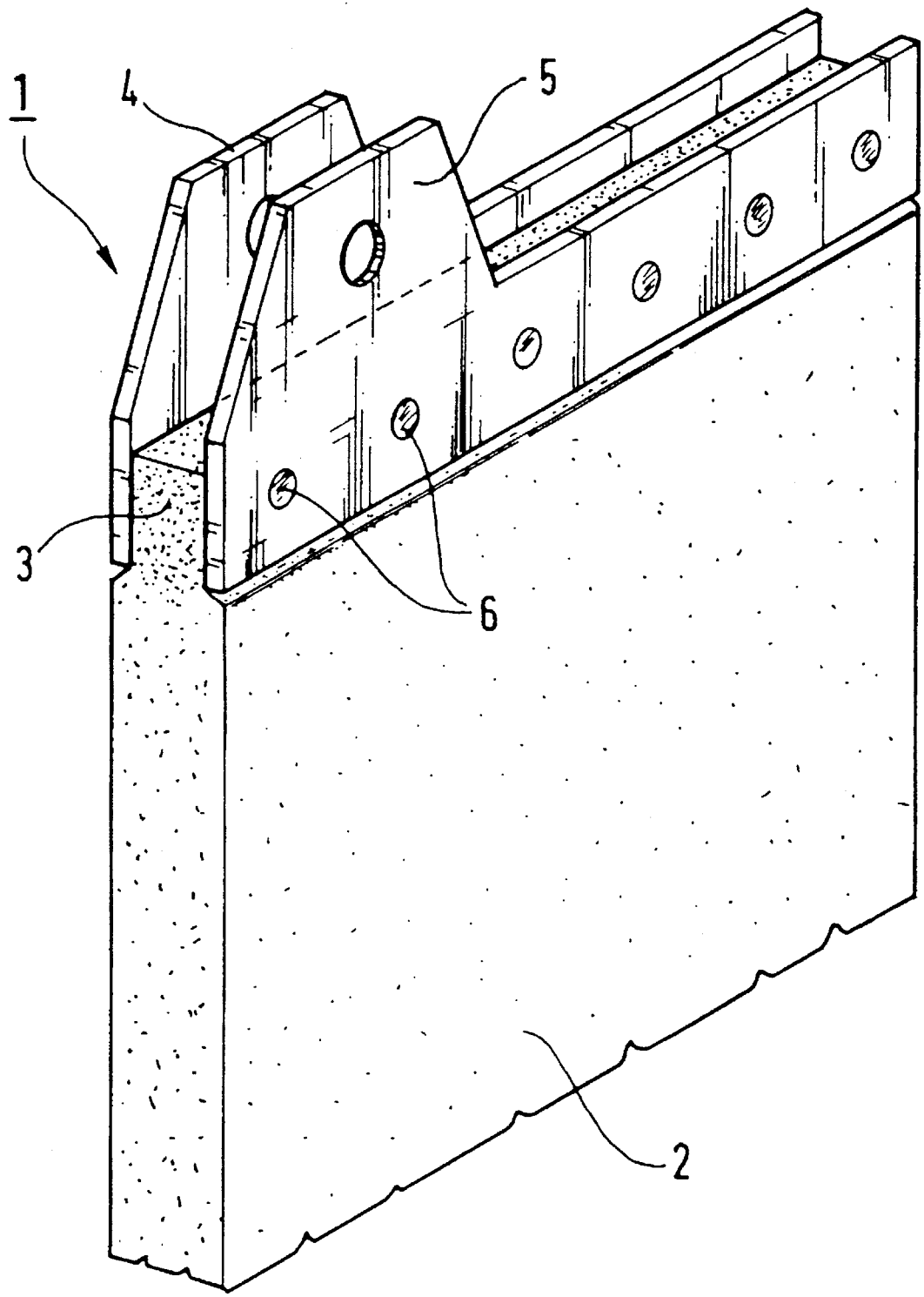
FIG. 1 is a diagrammatic perspective view of an electrode that is not part of the invention.

FIG. 1 shows an electrode 1 that is not part of the present invention. That electrode includes a core 2 made of nickel foam having an initial thickness of 1.7 mm and a weight per unit area of 500 grams per square meter (g/m$^2$).

Nickel hydroxide was pasted onto the core, except in the region 3 to which the connection was to be bonded. The pasted core 2 was compressed to a thickness of 1 mm. Metal strips 4 and 5 made of nickel-plated steel that was 0.1 mm thick were then pressed on respective sides of the region 3 of the core 2, and over the entire width of the electrode. The strips and the region 3 were compressed and spot welded together (the spot welds are referenced 6). The electrode 1 was 70 mm wide and 150 mm high.

Example II

Figure 2A:
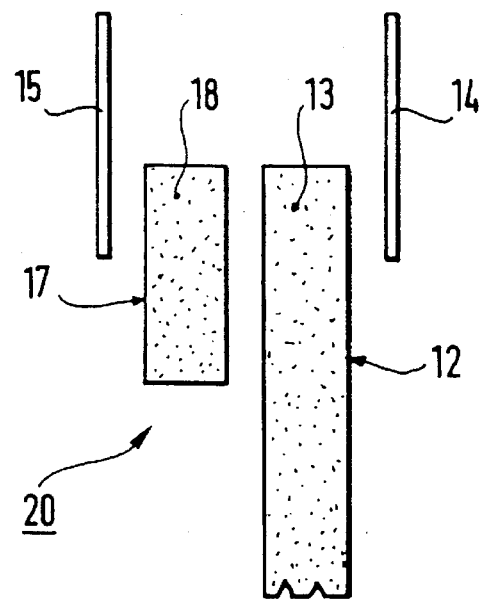
FIG. 2A is a highly-diagrammatic exploded fragmentary view in cross-section through a main core, through a retaining core and through two strips, the cores and the strips being used to form an electrode of the invention.
Figure 2B:
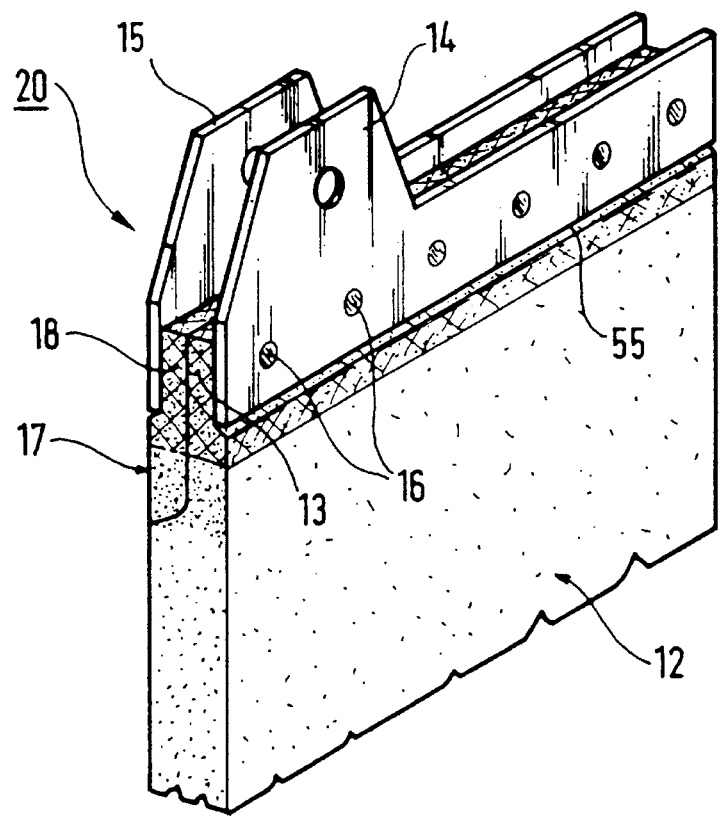
FIG. 2B is a highly-diagrammatic perspective view of the electrode shown in FIG. 2A after it has been bonded to its connection in accordance with the invention.

In an embodiment of the invention that is shown in FIGS. 2A and 2B, a main core 12 was used that was analogous to core 2, and two metal strips 14 and 15 were used that were analogous to strips 4 and 5. But, a retaining core 17 made of nickel foam having an initial thickness of 1.7 mm and a weight per unit area of 500 g/m$^2$ was disposed between strip 15 and the main core 12, in line with the welding region provided for welding to the connection, and over the entire width of the electrode.

The height of that portion 18 of the retaining core 17 which was to be involved in the welding was about one third of the total height of the retaining core (for example said total height may be 20 cm for an electrode that is 150 mm high).

The connection was spot welded to the electrode (the spot welds being referenced 16). The electrochemically-active substance (nickel hydroxide) was pasted onto the cores 12 and 17 except in the welding regions 13 and 18, and the resulting assembly was compressed to a final thickness for the electrode 20 of 1 mm.

Example III

Figure 3A:
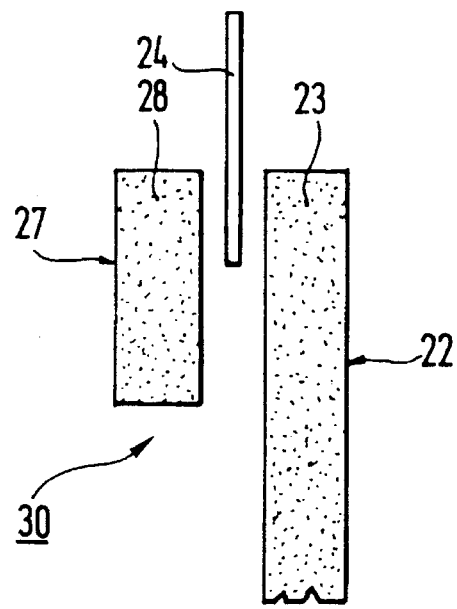
FIGS. 3A and 3B are analogous to FIGS. 2A and 2B, but they show a variant embodiment having a single strip.
Figure 3B:
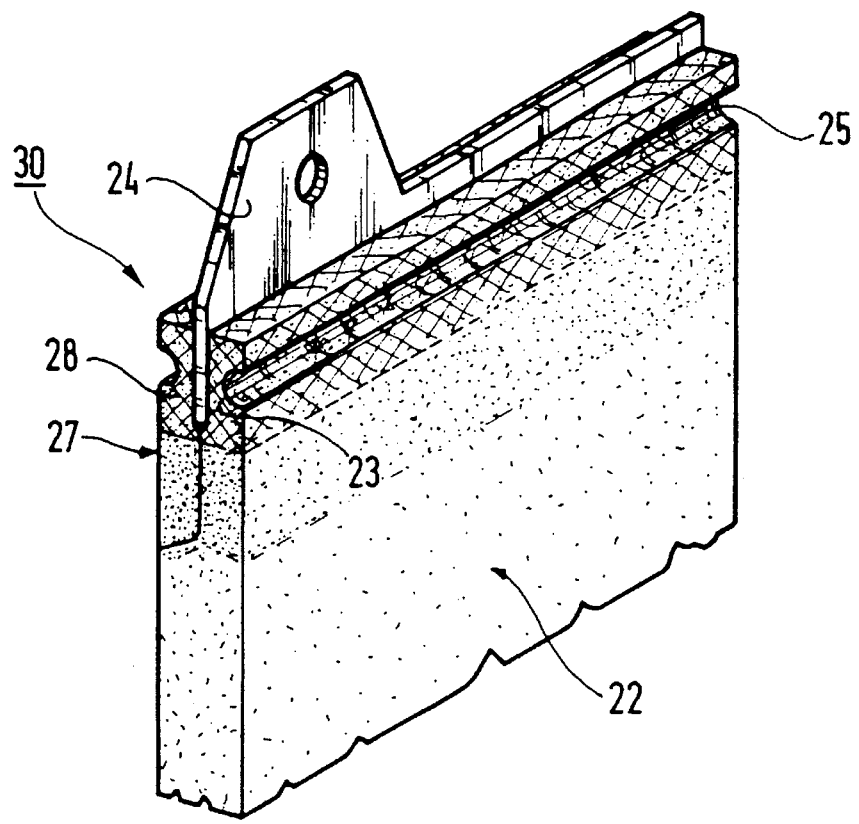

FIGS. 3A and 3B show a variant embodiment of an electrode of the invention.

The main core 22 made of nickel foam having an initial thickness of 1.7 mm and a weight per unit area of 500 g/m$^2$ was associated with a retaining core 27 that was analogous to core 17, and with a strip 24 that was analogous to the above-mentioned strips 14 and 15, but that was 0.2 mm thick. After being compressed, the connection and the electrode were bonded together by electrical seam welding represented diagrammatically by line 25. The cores 22 and 27 were pasted as above with nickel hydroxide, except in the regions 23 and 28 involved in the welding.

The resulting assembly was then compressed until an electrode 30 that was 1 mm thick was obtained.

The above three same-size electrodes (Examples I to III) were subjected to three types of test:

a tensile test performed at a speed of 5 mm per minute: the breaking stress was measured in decanewtons;

a reversed-bending endurance test: the electrode was held horizontal and it was rotated about a horizontal axis that was perpendicular to the connection; a count was taken of the number of revolutions required to break the connection; and an impedance test: the impedance, i.e. the voltage to current ratio as measured at a discharge level of 35% was tested; the impedance represented the electrical resistance of the electrode in milliohms.

Table I gives the results of the various tests.

TABLE I

| | Rupture force in daN | Number of revolutions | Impedance mohms |
|---|---|---|---|
| Example I | 4.1 | 2 | 8.3 |
| Example II | 13 | 28 | 4.4 |
| Example III | 11 | >50 | 3.6 |

This table clearly shows the improvements made by performing the method of the invention.

It can also be observed that the central strip in example III is inside the electrode, and there is no danger of it damaging the separators situated on either side of the electrode in the storage cell; in this way, short-circuits can be avoided.

In this variant, if the electrochemically-active substance is conductive, it is possible to paste it onto regions 23 and 28 of cores 22 and 27 before the connection is bonded to the electrode. In this way, optimum capacity can be achieved for electrode.

In the above examples, the retaining core and the main core were made of identical nickel foams. But, depending on the desired optimum characteristic, it is possible to vary the thickness and the weight per unit area of the chosen foams, within the above-indicated limits.

Figure 4A:
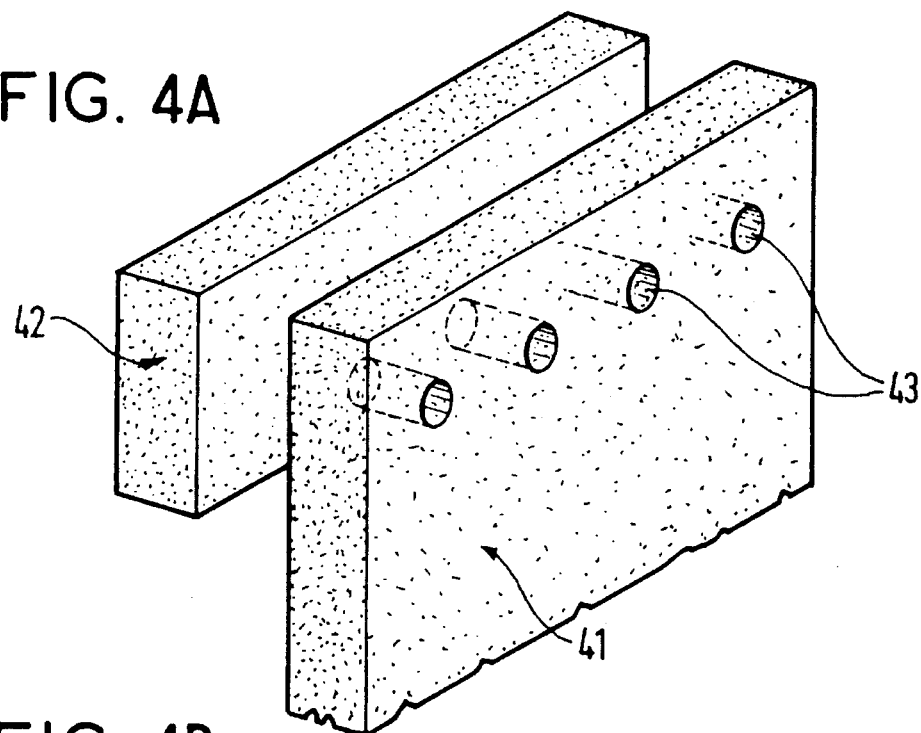
FIGS. 4A and 4B are respectively an exploded perspective view and a section view of an improved bond between a main core and a retaining core that are used to form an electrode of the invention.
Figure 4B:
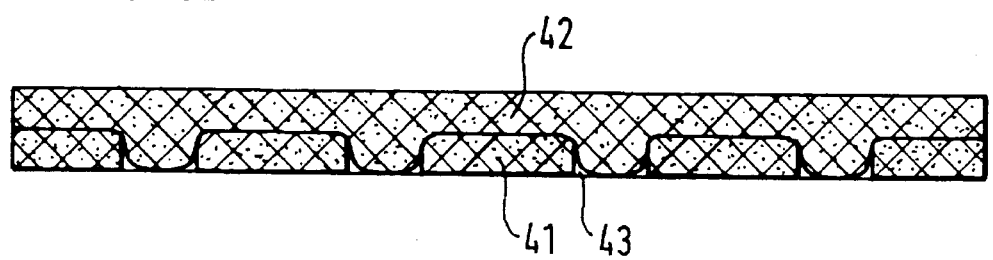

FIGS. 4A and 4B show an improvement to the method of the invention, whereby prior to any bonding operation, the retaining core 42 is fastened securely to the main core 41.

For that purpose, holes 43 having respective diameters of 6 mm are provided at a pitch of 15 mm in the nickel foam of the main core 41 which has an initial thickness of 1.7 mm and a weight per unit area of 500 g/m$^2$. The diameter of the holes may be varied in the range 2 mm to 8 mm, and the pitch may be varied in the range 5 mm to 50 mm. The retaining core 42 initially has the same characteristics as the main core 41. On being compressed, the two cores become interfitted as shown in the diagrammatic section view of FIG. 4B.

Figure 5:
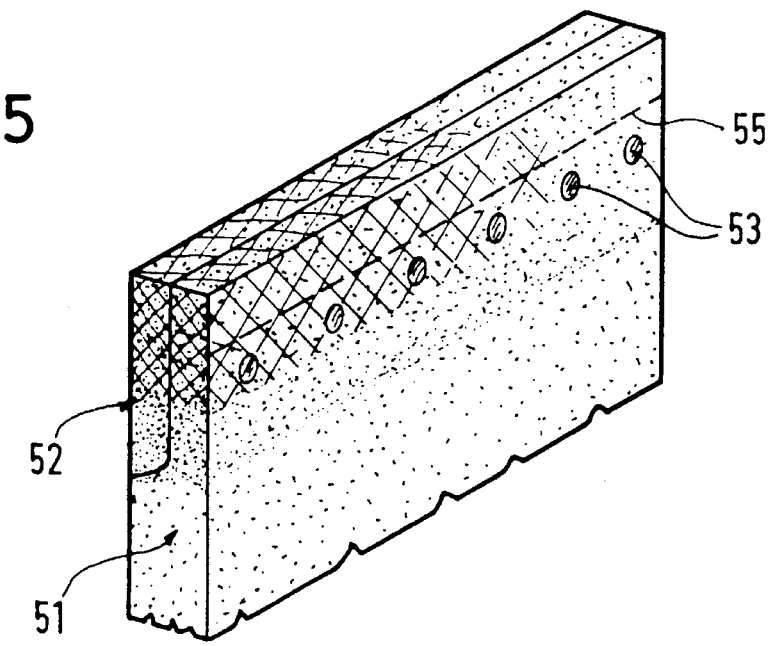
FIG. 5 is a diagrammatic perspective view showing another improved bond between a main core and a retaining core that are used to form an electrode of the invention.

FIG. 5 shows other means for fastening together cores 51 and 52 that are respectively analogous to cores 41 and 42. Initially, the cores are compressed and spot welded together. The diameter of the spot welds 53 is 2 mm, and it may be varied in the range 1 mm to 4 mm. The pitch of the spot welds is 15 mm and it may be varied in the range 5 mm to 50 mm.

The line of the spot welds is located below the welding region to which the connection is welded. To show this layout better, FIG. 2B includes a line referenced 55 that corresponds to the edge of strip 14.

Figure 6:
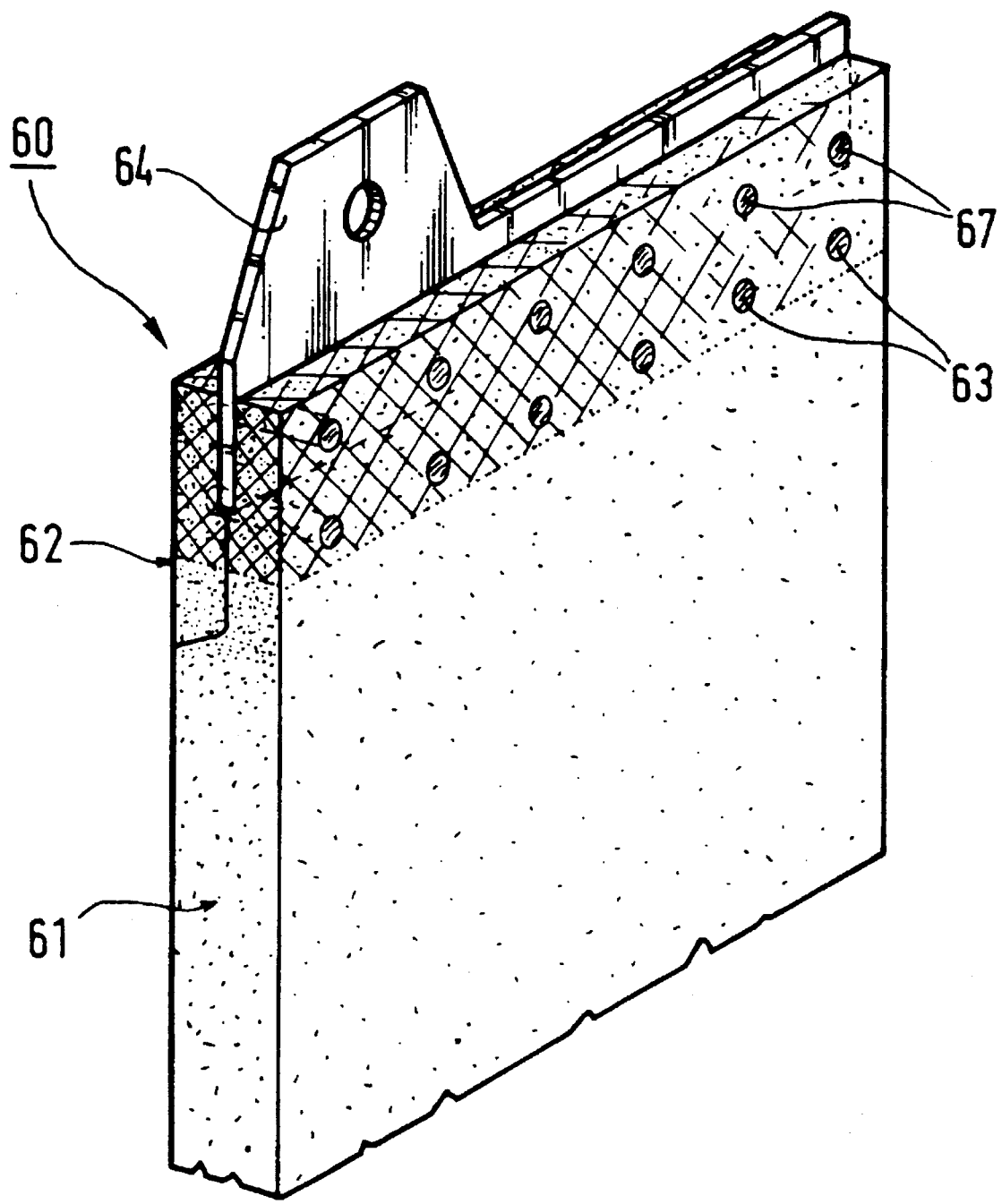
FIG. 6 is a diagrammatic perspective view showing another variant of an electrode obtained by performing the method of the invention.

FIG. 6 shows a variant embodiment of an electrode 60 obtained by performing the method of the invention. In this variant, the electrode 60 includes a central strip 64 that is analogous to the strip 24 of the electrode shown in FIG. 3B. Cores 61 and 62 are analogous to the cores 51 and 52 shown in FIG. 5, and the central strip 64 is interposed between them. The two cores are compressed and welded together by means of spot welds 63, and the two cores are welded to the strip by means of spot welds 67. Paste is then applied to the electrode over its entire height, and the electrode is then compressed.

Naturally, the invention is not limited to the examples given. In particular, without going beyond the ambit of the invention, the order of steps for manufacturing the electrode may be modified, as may the parameters of the structures of the cores, and the foams may be replaced with felts. Furthermore, the connection and the retaining core may be pressed against only a portion of the width of the electrode. Preferably, that portion is not less than half the width of the electrode.

We claim:

1. A method of bonding a metal connection to an electrode for an electrochemical cell, the electrode including a main core having one of a fiber and a foam structure, the metal connection including at least one metal strip, said method comprising steps of:

positioning a retaining core having substantially the same fiber or foam structure as the main core, but different dimensional characteristics, next to the main core;

pressing the at least one metal strip against one edge of the main core and the retaining core; and welding the at least one metal strip to the main core and the retaining core.

2. A method of bonding a metal connection to an electrode according to claim 1, wherein a single metal strip is used, and wherein said positioning step comprises positioning the single metal strip between the main core and the retaining core.

3. A method of bonding a metal connection to an electrode according to claim 1, wherein two metal strips are used, and wherein said positioning step comprises positioning one of the metal strips on each side of a core assembly formed by the main core and the retaining core.

4. A method of bonding a metal connection to an electrode according to claim 1, further comprising steps of pasting an electrochemically-active substance onto the main core and the retaining core after said welding step, and thereafter compressing the main core and the retaining core.

5. A method of bonding a metal connection to an electrode according to claim 1, comprising ordered steps of:

bonding the main Core and the retaining core by compression;

pasting an electrically-conductive electrochemically-active substance onto the main core and the retaining core;

compressing the main core and the retaining core; and welding the metal connection to the main core and the retaining core.

6. A method of bonding a metal connection to an electrode according to claim 1, comprising ordered steps of:

bonding the main core and the retaining core by compression;

pasting a non-conductive electrochemically-active substance onto the main core and the retaining core, except in a region in which the metal connection is to be welded;

compressing the main core and the retaining core; and welding the metal connection to the main core and the retaining core.

7. A method according to claim 4, further comprising a step of forming a plurality of perforations of diameter lying in a range of about 2 mm to about 8 mm in either one of the main core and the retaining core at a pitch lying in a range of about 5 mm to about 50 mm, for fastening the main core and the retaining core.

8. A method according to claim 4, further comprising a step of performing one of electrical and ultrasonic spot welding for fastening the main core and the retaining core.

9. A method according to claim 1, further comprising steps of applying an electrochemically-active substance to the main core and the retaining core, and selecting the electrochemically-active substance from nickel hydroxide, hydridable alloys, carbon, cadmium oxide, zinc oxide, zinc hydroxide, and silver oxide.

10. A method according to claim 1, further comprising a step of selecting a material of said main core and of said retaining core from a nickel foam, a nickel-plated foam, and one of a nickel-plated and silver-plated polyurethane felt.

11. A method according to claim 1, wherein the at least one metal strip is made of nickel-plated steel having a thickness lying in a range of from about 0.05 mm to about 1 mm, and wherein the main core and the retaining core are made of nickel foam having a weight per unit area lying in a range of from about 200 $g/m^2$ to about 2,000 $g/m^2$, an initial thickness of the main core lying in a range of from about 0.5 mm to about 5 mm, and an initial thickness of the retaining core also lying in a range of from about 0.5 mm to about 5 mm.

12. A method according to claim 11, wherein the weight per unit area is about 500 $g/m^2$, and wherein the initial thickness of the main core is about 1.7 mm and the initial thickness of the retaining core is also about 1.7 mm.

13. A method according to claim 1, wherein the at least one metal strip is made of nickel-plated steel having a thickness lying in a range of from about 0.05 mm to about 1 mm, the main core is made of nickel foam having a weight per unit area lying in a range of from about 500 $g/m^2$ to about 900 $g/m^2$, and an initial thickness lying in a range of from about 1.4 mm to about 2.5 mm, and the retaining core is made of nickel foam having a weight per unit area lying in a range of from about 500 $g/m^2$ to about 1,500 $g/m^2$, and an initial thickness lying in a range of from about 1.4 mm to about 2.5 mm.

14. A method according to claim 1, wherein the height of the at least one metal strip is less than half the height of the retaining core.

15. An electrode obtained by performing the method according to claim 1.

* * * * *